W. BURNIP.
SLED RUNNER FOR AUTOMOBILES.
APPLICATION FILED OCT. 7, 1916.
1,269,255.
Patented June 11, 1918.
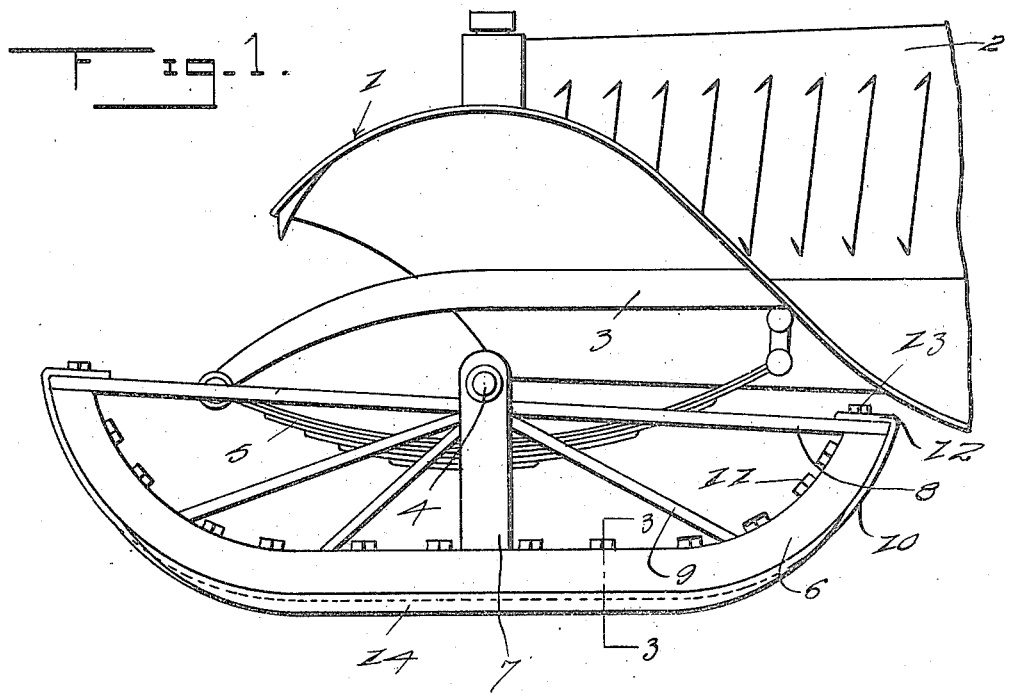
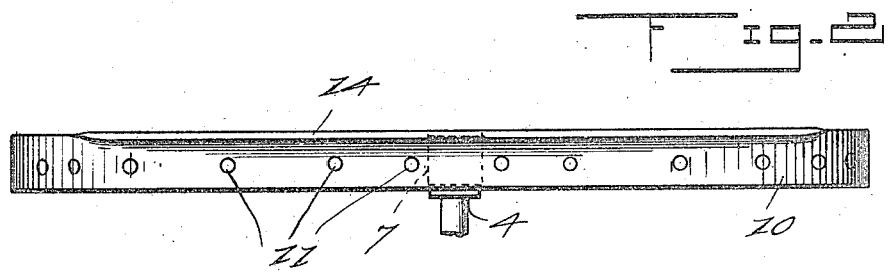
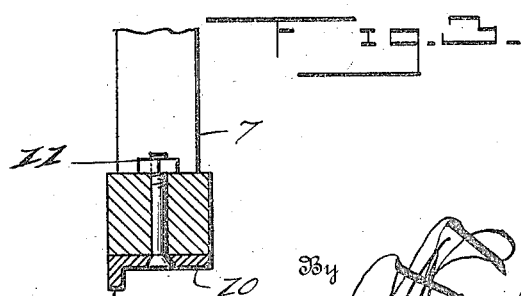
Inventor
W. Burnip.

UNITED STATES PATENT OFFICE.

WILLIAM BURNIP, OF CHASE RIVER, BRITISH COLUMBIA, CANADA.

SLED-RUNNER FOR AUTOMOBILES.

1,269,255.  Specification of Letters Patent.  Patented June 11, 1918.

Application filed October 7, 1916. Serial No. 124,322.

*To all whom it may concern:*

Be it known that I, WILLIAM BURNIP, Canadian, citizen of British Columbia, residing at Chase River, Province of British Columbia, Dominion of Canada, have invented certain new and useful Improvements in Sled-Runners for Automobiles; and I do hereby declare the following to be a full, clear, and exact description of the invention, such as will enable others skilled in the art to which it appertains to make and use the same.

This invention relates to new and useful improvements in a sled runner for automobiles and one of its objects is the provision of a device of this character, which shall be simple, durable and efficient, and which may be manufactured and sold at a comparatively low cost.

Another object of this invention is to provide a frame having means for securing it to an automobile axle and having mounted thereon a shoe which is bent to form a longitudinally extending rib or flange, adapted to bite into the snow or ice to prevent the automobile from skidding and which will assure correct and easy steering of the automobile.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a fragmentary side elevation of an automobile, illustrating a sled runner attached thereto, constructed in accordance with my invention.

Fig. 2 is a bottom plan view of the shoe, and

Fig. 3 is a transverse sectional view taken on the line 3—3 of Fig. 1.

Referring in detail to the drawing, the numeral 1 indicates as an entirety the front portion of an automobile, consisting of a body 2, mounted upon a chassis 3, which is in turn connected to the usual front axle 4 by the springs 5. The front axle 4 is of the usual stub axle type and to which my invention is applied.

In applying my invention to an automobile, the front wheels are removed and the rear or drive wheels have applied thereon non-skid chains, whereby the back or drive wheels may bite or engage within the snow or ice so that the automobile will be propelled. As both of the sled runners that are adapted to be applied to the front axle of the automobile are identical in construction, it is not now deemed necessary to describe each in detail. A felly 6 having each and curved upwardly has secured centrally thereof a vertically extending standard 7 which is apertured at the upper end to receive the axle 4 and is secured thereon in any suitable manner. Horizontal brace rods 8 are secured to the upper curved end of the felly 6 and to the vertical standard 7 for bracing the felly. Upwardly inclined braces 9 are secured to the felly 6 adjacent the curved portion thereof and to the upper end of the vertical standard for further bracing the felly.

A shoe 10 is secured to the felly 6 by means of bolts 11 and has each end bent at right angles as illustrated at 12 and secured to the felly and horizontal braces 8 by means of bolts 13. The shoe 10 is bent to conform to the contour of the felly 6 as clearly illustrated in Fig. 1. The shoe 10 has formed upon one side thereof a right angled flange 14 which extends from one curved portion of the shoe 10 to the other curved portion thereof. The flange 14 is adapted to bite into the snow or ice to prevent the shoe 10 from skidding thereon, whereby a device has been provided which will efficiently steer the automobile as the flange 14 will prevent any lateral movement of the automobile, thereby preventing skidding.

While I have shown and described the preferred embodiment of my invention, it will be understood that minor changes in construction, combination and arrangement of parts may be made without departing from the spirit and scope of the invention as claimed.

Having thus described my invention, what I claim is:—

A sled runner comprising a felly having each end curved upwardly to form a horizontal portion, means securing said felly to an axle, a flat shoe secured to said structure and having its ends bent about the ends of the felly and having a horizontal portion; and a right angled flange formed on one edge of the horizontal portion of the shoe and having tapering curved ends to conform to the contour of the shoe.

In testimony whereof I affix my signature in presence of two witnesses.

WILLIAM BURNIP.

Witnesses:
  CUTHBERT BARRASS,
  GEORGE HENRY GREEN.